(12) United States Patent
Hsu

(10) Patent No.: US 8,418,848 B2
(45) Date of Patent: Apr. 16, 2013

(54) DISC PACKAGE ASSEMBLY

(75) Inventor: Peng-Kai Hsu, Hsinchu (TW)

(73) Assignee: Princo Middle East FZE, Dubai (AE)

( * ) Notice: Subject to any disclaimer, the term of this patent is extended or adjusted under 35 U.S.C. 154(b) by 0 days.

(21) Appl. No.: 13/241,169

(22) Filed: Sep. 22, 2011

(65) Prior Publication Data

US 2013/0008811 A1    Jan. 10, 2013

(30) Foreign Application Priority Data

Jul. 7, 2011    (TW) .............................. 100212445 U

(51) Int. Cl.
*B65D 85/57* (2006.01)
*B65D 85/00* (2006.01)

(52) U.S. Cl.
USPC ......... 206/308.1; 206/493; 206/303; 206/310

(58) Field of Classification Search ............... 206/308.1, 206/303, 310, 493, 307; 369/2; 720/7
See application file for complete search history.

(56) References Cited

U.S. PATENT DOCUMENTS

| | | | | |
|---|---|---|---|---|
| 4,700,839 A | * | 10/1987 | Fujii | 206/308.3 |
| 6,112,894 A | * | 9/2000 | Kikuchi et al. | 206/308.1 |
| 6,119,872 A | * | 9/2000 | Flores et al. | 211/40 |
| 6,296,114 B1 | * | 10/2001 | Bubb et al. | 206/308.1 |
| 6,880,697 B2 | * | 4/2005 | Cheng | 206/303 |
| 7,121,405 B2 | * | 10/2006 | Ito et al. | 206/308.1 |
| 7,147,107 B2 | * | 12/2006 | Haggard et al. | 206/710 |
| 8,113,344 B2 | * | 2/2012 | Arun et al. | 206/308.1 |
| 2003/0015441 A1 | * | 1/2003 | Kang et al. | 206/310 |
| 2003/0098251 A1 | * | 5/2003 | Yang | 206/303 |
| 2004/0099548 A1 | * | 5/2004 | Ito et al. | 206/303 |
| 2004/0134806 A1 | * | 7/2004 | Ferguson et al. | 206/307 |
| 2004/0154938 A1 | * | 8/2004 | Chang | 206/308.1 |
| 2004/0251150 A1 | * | 12/2004 | Cheng | 206/308.1 |
| 2006/0266664 A1 | * | 11/2006 | Yeh | 206/308.1 |
| 2007/0187269 A1 | * | 8/2007 | Grasso et al. | 206/308.1 |
| 2008/0017534 A1 | * | 1/2008 | Lo et al. | 206/307.1 |
| 2008/0222669 A1 | * | 9/2008 | Ke | 720/719 |

FOREIGN PATENT DOCUMENTS

GB    2351484 A    1/2001

* cited by examiner

*Primary Examiner* — Steven A. Reynolds
(74) *Attorney, Agent, or Firm* — Pai Patent & Trademark Law Firm; Chao-Chang David Pai

(57) ABSTRACT

A disc package assembly for packaging and accommodating multiple discs is provided. The disc package assembly includes an upper cover and a base. The upper cover includes a through-hole, a first annular protrusion, a second annular protrusion, and a restraining portion. The thickness of the upper cover gradually increases from the edge of the upper cover toward the center. Further, the base includes a hollow fastening portion and a third annular protrusion. An annular part is formed at the upper end of the fastening portion and has several slots. The fastening portion includes a central through-hole penetrating through the base. The thickness of the base gradually increases from the edge of the base toward the center. The disc package assembly may further include a thermal shrink film for wrapping over the disc package assembly and the discs.

7 Claims, 5 Drawing Sheets

DISC PACKAGE ASSEMBLY

CROSS REFERENCE TO RELATED APPLICATIONS

The present application is based on, and claims priority from, Taiwan Application Serial Number 100212445, filed on Jul. 7, 2011, the disclosure of which is hereby incorporated by reference herein in its entirety.

BACKGROUND

As shown in FIG. 1, a conventional disc may comprise: a central aperture 20, a clamping region 21 around the central aperture 20, and a data recording region 22 around the outside of the clamping region 21. In general, before shipping, the central apertures 20 of a number of discs (one unit usually has 50 or 100 discs) are aligned to one another along a central axis to stack the discs in tube-shape, and additional dummy discs are placed on the upper and the lower ends of the disc stack. And then the disc stack which comprises dummy discs is wrapped with a thermal shrink film and fixed by heating the thermal shrink film so that the thermal shrink film will shrink and hold the disc stack tightly.

However, if the discs, DVDs (digital versatile discs) in particular, are packaged in the forementioned manner, the discs would often be damaged by axial compression during shipping. Therefore, it is desirable to have a disc package assembly to mitigate the problem of disc damages by axial compression during shipping and handling.

SUMMARY

To resolve the above issues, the present invention provides a disc package assembly for packaging and accommodating multiple discs. The disc package assembly includes an upper cover and a base. The upper cover of the package assembly comprises a through-hole, a first annular protrusion, a second annular protrusion, and a restraining portion. The through-hole is located at the center of the upper cover. The first annular protrusion surrounds the through-hole. The second annular protrusion surrounds the first annular protrusion. And the restraining portion is located between the first annular protrusion and the through-hole. The thickness of the upper cover gradually increases from the edge of the upper cover toward the center. Further, the base of the package assembly comprises a hollow fastening portion formed at the center of the base and a third annular protrusion surrounding the fastening portion. An annular part is formed at the upper end of the fastening portion and has several slots. The fastening portion comprises a central through-hole penetrating through the base. The thickness of the base gradually increases from the edge of the base toward the center. The annular part of the fastening portion is inserted, accommodated and fixed in the first annular protrusion and restrained by the restraining portion of the upper cover. The disc package assembly may further include a thermal shrink film for wrapping over the disc package assembly and the discs accommodated in the disc package assembly.

Other aspects and advantages of the present invention will become apparent from the following detailed descriptions in conjunction with drawings for illustrating the principles of the present invention. In addition, well-known elements and principles will not be described in the specification to avoid any unnecessary obscure to the present invention.

BRIEF DESCRIPTION OF THE DRAWINGS

In the accompanying drawings of the invention, the same elements are denoted with identical numerals, in which.

DETAILED DESCRIPTION OF THE EXEMPLARY EMBODIMENTS

Figure 2:
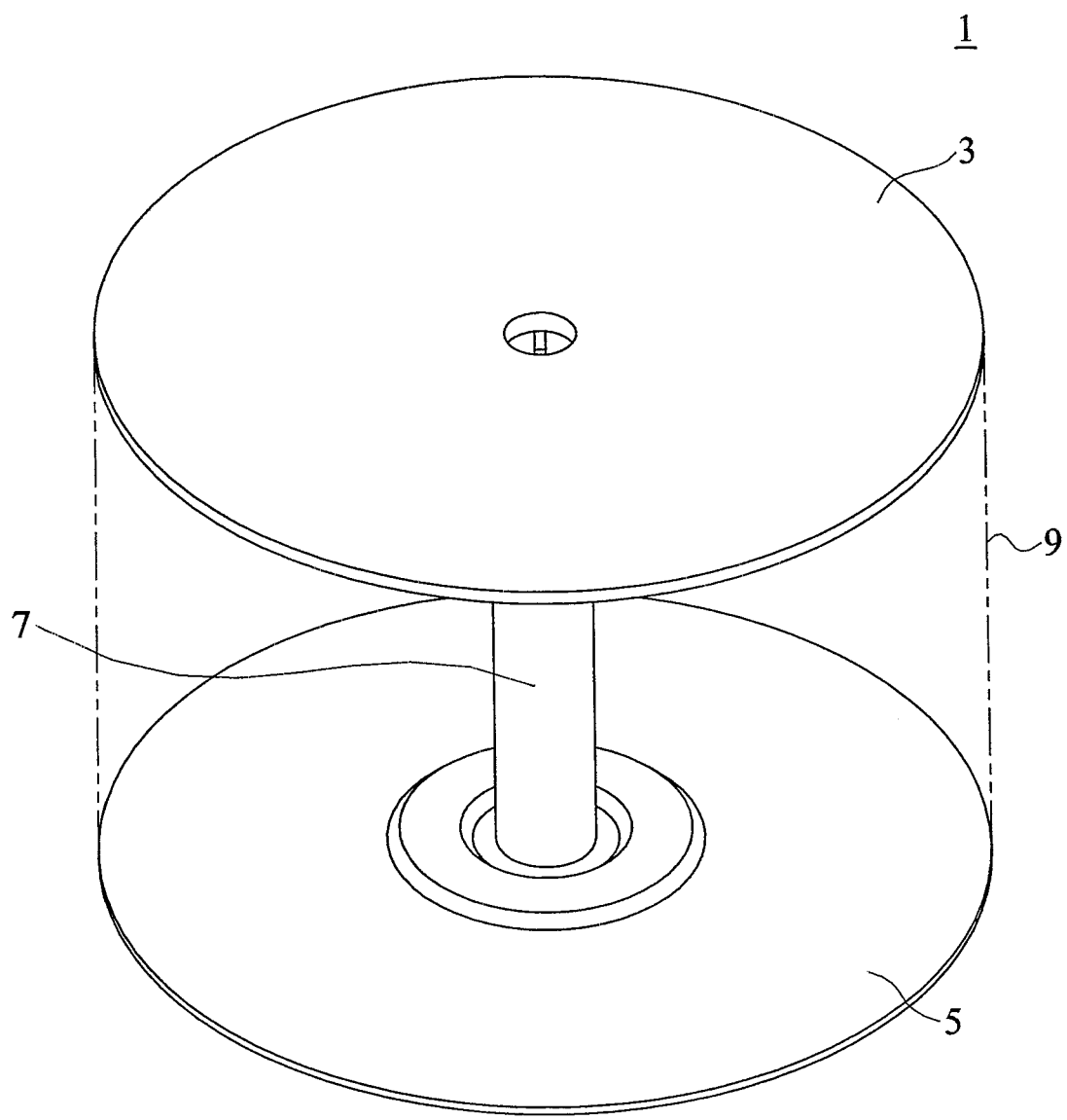
FIG. 2 illustrates a three dimensional view of a disc package assembly in accordance with an embodiment of the invention.

FIG. 2 illustrates a three dimensional view of a disc package assembly 1 in accordance with an embodiment of the invention. As shown, the disc package assembly 1 may include an upper cover 3 and a base 5 with a hollow fastening portion 7. The disc package assembly 1 of the invention may be used to package and accommodate multiple discs (not shown). The disc package assembly 1 may further include a thermal shrink film 9 for wrapping over the disc package assembly 1 and the discs accommodated in the disc package assembly 1.

Figure 3:
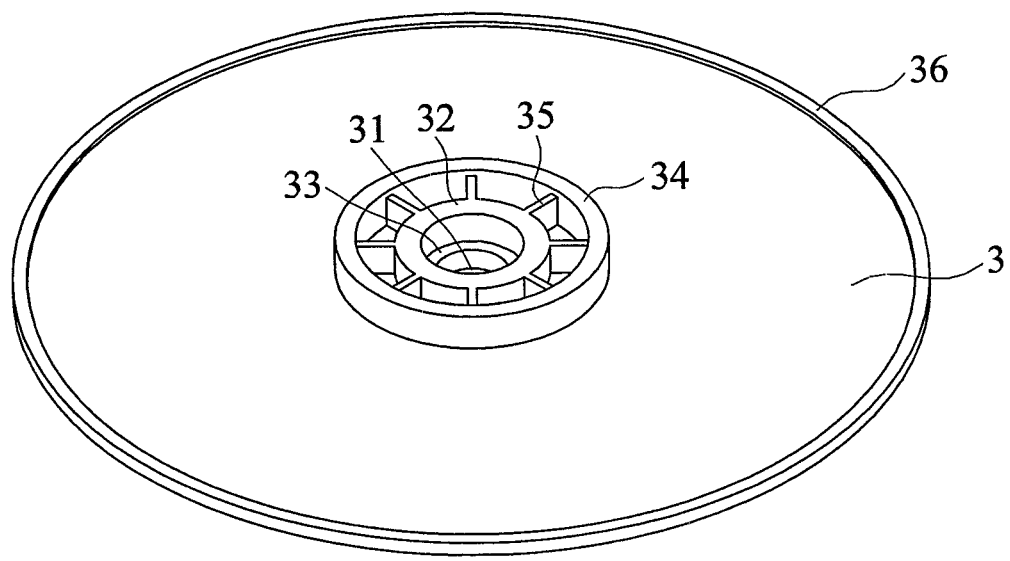
FIG. 3 illustrates a three dimensional view of an upper cover of the disc package assembly shown in FIG. 2.
Figure 4:
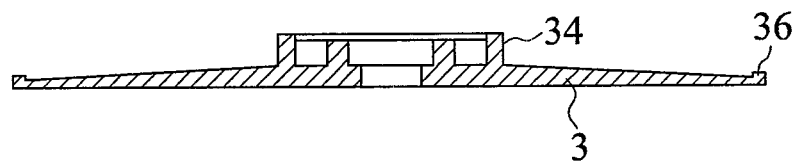
FIG. 4 illustrates a schematic cross-section view of the upper cover shown in FIG. 3.

FIG. 3 illustrates a three dimensional view of the upper cover 3 of the disc package assembly 1 shown in FIG. 2 while FIG. 4 illustrates a schematic cross-section view of the upper cover 3 shown in FIG. 3. As shown, the upper cover 3 may comprise a through-hole 31, an annular protrusion 32, a restraining portion 33, and another annular protrusion 34. The through-hole 31 is located at the center of the upper cover 3. The annular protrusion 32 surrounds the through-hole 31. The restraining portion 33 is located between the annular protrusion 32 and the through-hole 31. And the annular protrusion 34 surrounds the annular protrusion 32. The thickness of the upper cover 3 gradually increases from the edge of the upper cover 3 toward the center. The design of gradually increased thickness from the edge of the upper cover 3 toward the center thereof may enhance the overall strength of the upper cover 3.

Figure 1:
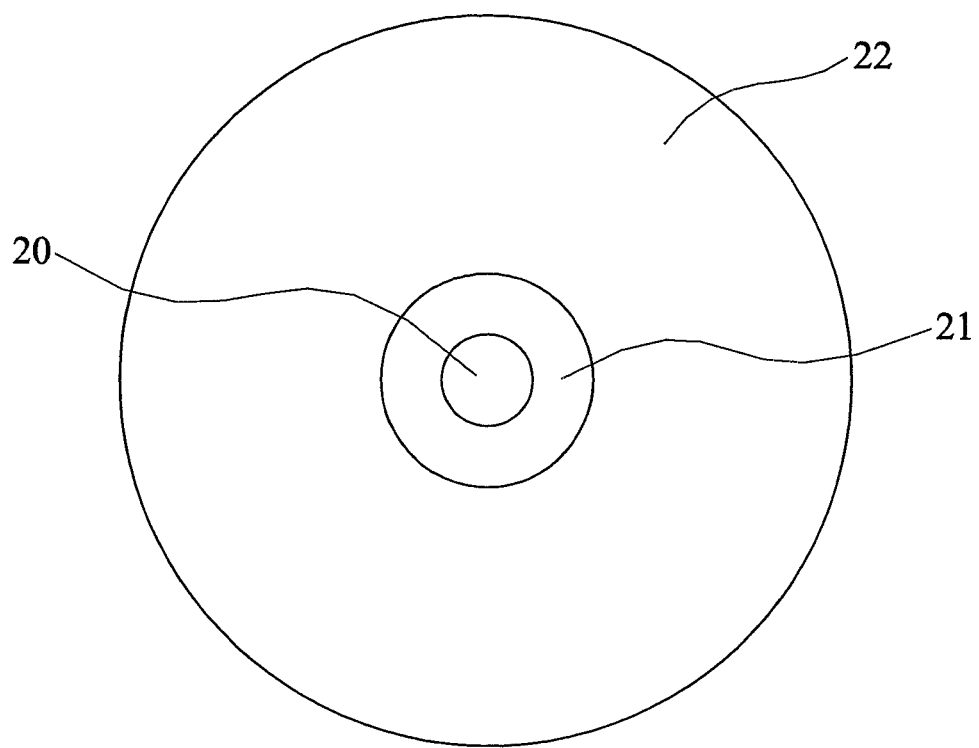
FIG. 1 illustrates a top view of a conventional disc.

A number of ribs 35 may be provided between the annular protrusion 32 and the annular protrusion 34. These ribs 35 may further enhance the overall strength of the upper cover 3. The annular protrusion 34 and/or the annular protrusion 32 contact the upper surface of the clamping region 21 of the disc (as shown in FIG. 1). An annular protrusion 36 may be provided at the edge of the upper cover 3. Further, the upper cover 3 may be made of materials such as polycarbonate (PC).

Figure 5:
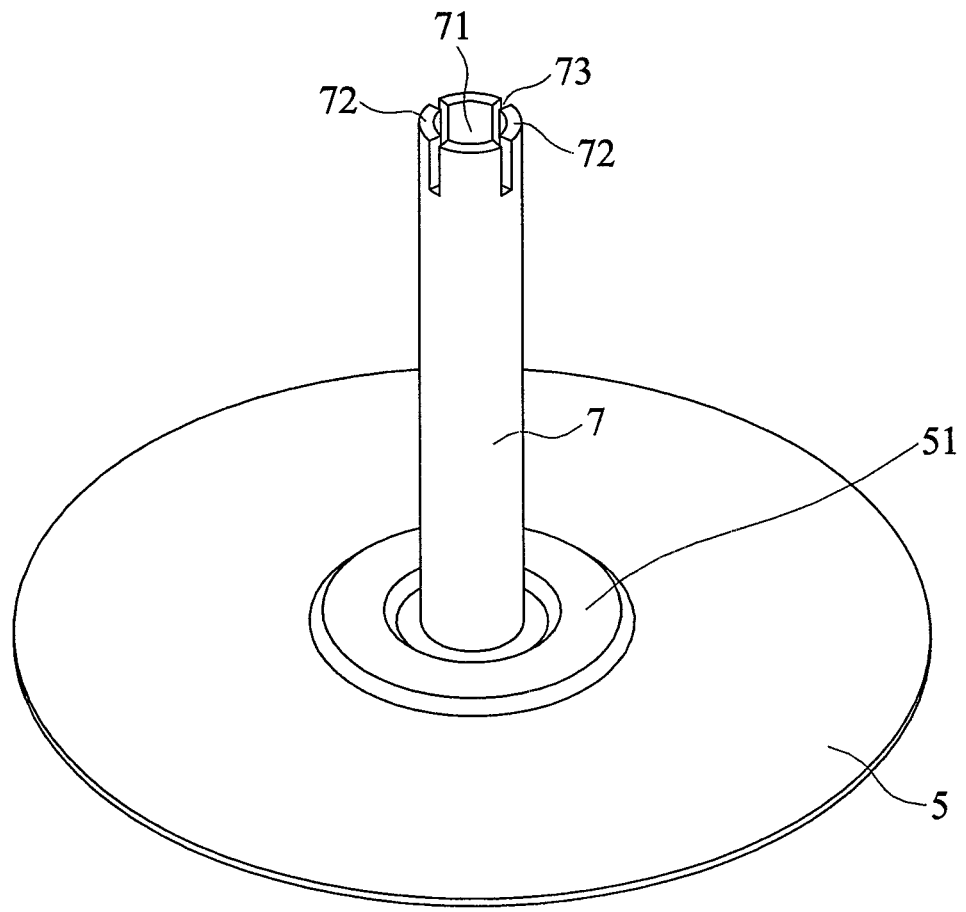
FIG. 5 illustrates a three dimensional view of a base and a hollow fastening portion of the disc package assembly shown in FIG. 2.
Figure 6:
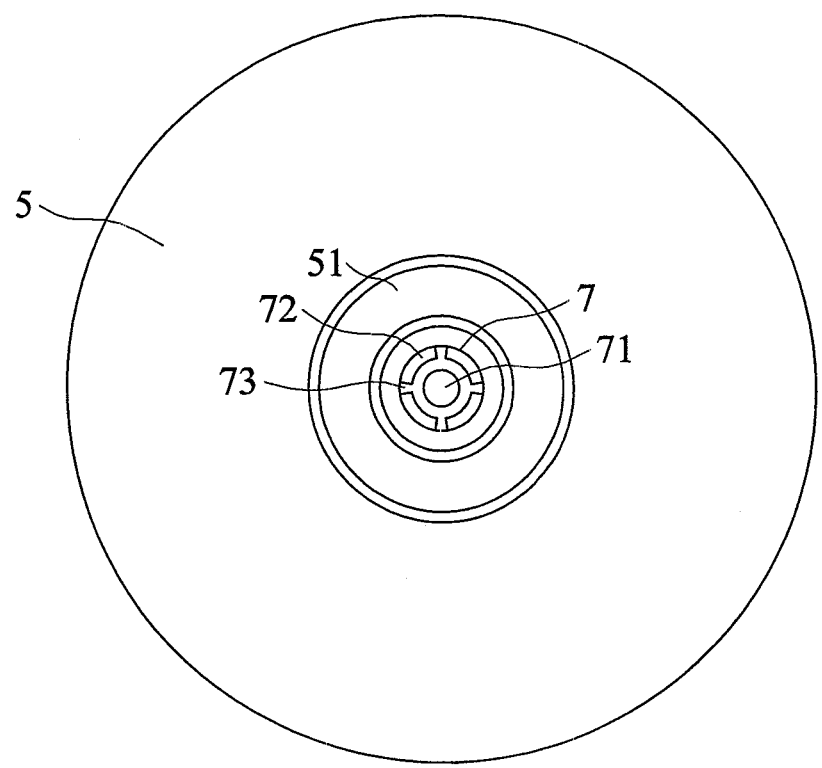
FIG. 6 illustrates a top view of the base and the hollow fastening portion shown in FIG. 5.
Figure 7:
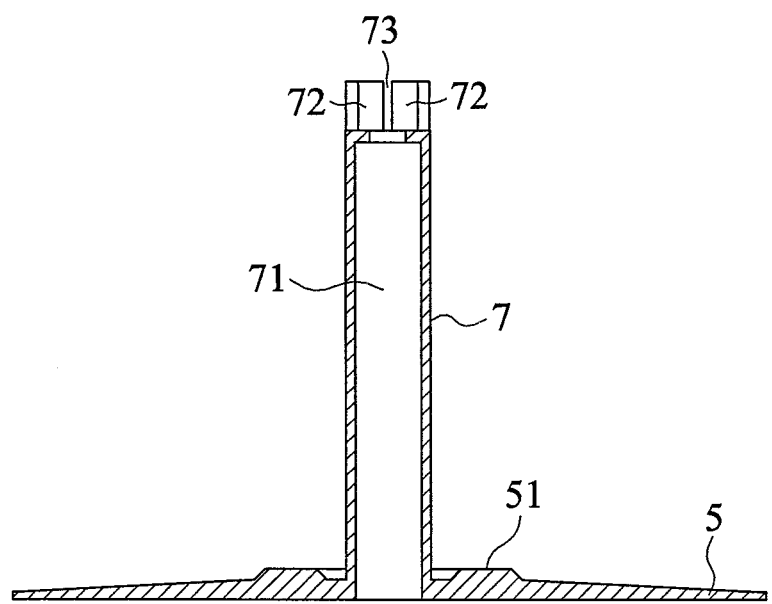
FIG. 7 illustrates a schematic cross-section view of the base and the hollow fastening portion shown in FIG. 6.

FIG. 5 illustrates a three dimensional view of the base 5 and the hollow fastening portion 7 of the disc package assembly 1 shown in FIG. 2, FIG. 6 illustrates a top view of the base 5 and the hollow fastening portion 7 shown in FIG. 5, and FIG. 7 illustrates a schematic cross-section view of the base 5 and the hollow fastening portion 7 shown in FIG. 6. In the invention, the hollow fastening portion 7 may be integrally formed with the base 5 at the center of the base 5. The hollow fastening portion 7 comprises a central through-hole 71 penetrating through the entire base 5. The central through-hole 71 is aligned with the through-hole 31 of the upper cover 3. The discs may be fixed by passing the fastening portion 7 through the central apertures 20 of the discs (FIG. 1). The base 5 may comprise an annular protrusion 51 which surrounds the fastening portion 7 and is in contact with the lower surface of the clamping region 21 of the disc (as shown in FIG. 1) to support the disc. The thickness of the base 5 gradually increases from the edge of the base 5 toward the center. The design of gradually increased thickness from the edge of the base 5 toward the center may enhance the overall strength of the base 5. Further, the base 5 and the fastening portion 7 may be made of materials such as polycarbonate (PC).

An annular part 72 is formed at the upper end of the hollow fastening portion 7 and may have several slots 73 so that the annular part 72 is flexible. In disc packaging process with the disc package assembly 1, discs may be placed onto the base 5 with the central apertures 20 (FIG. 1) passing through the fastening portion 7. After all the discs are placed, the annular part 72 of the fastening portion 7 is inserted, accommodated and fixed in the annular protrusion 32. In the meantime, the annular part 72 is restrained by the restraining portion 33 of the upper cover 3 so that it will not pass through the through-hole 31 of the upper cover 3. As described above, since the annular part 72 is designed with several slots 73, it becomes a plate spring like flexible structure. Therefore, the annular part 72 may be inserted, accommodated and fixed in the annular protrusion 32 without high level of precision needed. To enhance the stability of the disc package, a thermal shrink film 9 may be further used to wrap over the disc package assembly 1 and the discs accommodated in the disc package assembly 1. Specifically, the upper cover 3, the base 5, and the discs accommodated between the upper cover 3 and the base 5 may be wrapped with the thermal shrink film 9.

The problem of disc damages by axial compression during shipping and handling may be mitigated by using the disc package assembly to package the discs in accordance with the invention.

While the invention has been described in detail with reference to the preferred embodiments and illustrative drawings thereof, those skilled in the art will readily appreciate that various modifications, alterations, and equivalents may be implement without departing from the true spirit and the scope of the invention. Therefore, the modifications, alterations, and equivalents will still fall in the scope of the appended claims of the invention.

What is claimed is:

1. A disc package assembly for packaging and accommodating multiple discs, comprising:

an upper cover comprising a through-hole, a first annular protrusion, a second annular protrusion, and a restraining portion, wherein the through-hole is located at the center of the upper cover, the first annular protrusion surrounds the through-hole, the second annular protrusion surrounds the first annular protrusion, the restraining portion is located between the first annular protrusion and the through-hole, and the thickness of the entire upper cover gradually increases uniformly from the edge of the upper cover to the second annular protrusion; and a base comprising a hollow fastening portion formed at the center of the base and a third annular protrusion surrounding the fastening portion, wherein an annular part is formed at the upper end of the fastening portion and comprises several slots so that the annular part is flexible, the fastening portion comprises a central through-hole penetrating through the base, and the thickness of the entire base gradually increases uniformly from the edge of the base to the third annular protrusion, wherein the annular part is inserted, accommodated and fixed in the first annular protrusion and restrained by the restraining portion.

2. The disc package assembly according to claim 1, further comprising:

a thermal shrink film for wrapping over the disc package assembly and the multiple discs accommodated in the disc package assembly.

3. The disc package assembly according to claim 1, wherein a number of ribs are provided between the first and the second annular protrusions.

4. The disc package assembly according to claim 1, wherein a fourth annular protrusion is provided at the edge of the upper cover.

5. The disc package assembly according to claim 1, wherein the upper cover is made of polycarbonate.

6. The disc package assembly according to claim 1, wherein the base and the hollow fastening portion are made of polycarbonate.

7. The disc package assembly according to claim 1, wherein the central through-hole of the fastening portion is aligned with the through-hole of the upper cover.

\* \* \* \* \*